(12) United States Patent
Chiu et al.

(10) Patent No.: US 10,691,217 B2
(45) Date of Patent: Jun. 23, 2020

(54) METHODS AND SYSTEMS FOR PROVIDING A CAMERA-BASED GRAPHICAL USER INTERFACE

(71) Applicant: FUJI XEROX CO., LTD., Tokyo (JP)

(72) Inventors: Patrick Chiu, Mountain View, CA (US); Joseph Andrew Alkuino de la Peña, Palo Alto, CA (US); Laurent Denoue, Verona (IT); Chelhwon Kim, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 359 days.

(21) Appl. No.: 15/493,070

(22) Filed: Apr. 20, 2017

(65) Prior Publication Data

US 2018/0307316 A1    Oct. 25, 2018

(51) Int. Cl.
  *G06F 3/01*     (2006.01)
  *G06F 3/042*    (2006.01)
  *G06F 3/0488*   (2013.01)
  *G06F 3/03*     (2006.01)
  *G06F 40/14*    (2020.01)
  *G06F 40/58*    (2020.01)
  *G06F 40/117*   (2020.01)
  *G06F 40/154*   (2020.01)
  *G06F 40/166*   (2020.01)

(52) U.S. Cl.
  CPC ............ *G06F 3/017* (2013.01); *G06F 3/0304* (2013.01); *G06F 3/0425* (2013.01); *G06F 3/0426* (2013.01); *G06F 3/04883* (2013.01); *G06F 40/117* (2020.01); *G06F 40/14* (2020.01); *G06F 40/154* (2020.01); *G06F 40/166* (2020.01); *G06F 40/58* (2020.01)

(58) Field of Classification Search
  CPC ...... G06F 3/017; G06F 3/0425; G06F 3/0426; G06F 3/0304; G06F 3/04883; G06F 17/289; G06F 17/218; G06F 17/227; G06F 17/24; G06F 17/2247
  See application file for complete search history.

(56) References Cited

U.S. PATENT DOCUMENTS

6,644,322 B2 * 11/2003 Webb ................... A61B 5/0031
                                                         128/899
9,317,171 B2 *  4/2016 Chiu ....................... G06F 3/048
(Continued)

*Primary Examiner* — Matthew Ell
(74) *Attorney, Agent, or Firm* — Morgan, Lewis & Bockius LLP (57) ABSTRACT

A method at a computer system includes obtaining an electronic document comprising document elements, and injecting into the document in association with one of the document elements one or more hotspot attributes, the hotspot attributes defining attributes of a hotspot that is displayable in conjunction with the document element when the document is displayed, the hotspot attributes being associated with predefined physical gestures and respective document actions; such that the hotspot, when displayed as part of a displayed document, indicates that a viewer of the displayed document can interact with the displayed document using the predefined physical gestures (i) performed at a position that overlap a displayed version of the document in a field of view of a camera system and (ii) captured by the camera system, wherein a physical gesture results in a respective document action being performed on the displayed document.

15 Claims, 5 Drawing Sheets

(56) References Cited

U.S. PATENT DOCUMENTS

| | | | | |
|---|---|---|---|---|
| 9,632,686 | B1* | 4/2017 | Howard | H04L 12/1822 |
| 2006/0285772 | A1* | 12/2006 | Hull | G06F 21/78 |
| | | | | 382/305 |
| 2009/0079813 | A1* | 3/2009 | Hildreth | H04N 7/147 |
| | | | | 348/14.03 |
| 2013/0024819 | A1* | 1/2013 | Rieffel | G06F 3/011 |
| | | | | 715/848 |
| 2013/0271618 | A1* | 10/2013 | Koryakovskiy | H04N 5/23219 |
| | | | | 348/211.5 |
| 2014/0344766 | A1* | 11/2014 | Cao | G06F 3/017 |
| | | | | 715/863 |

* cited by examiner

METHODS AND SYSTEMS FOR PROVIDING A CAMERA-BASED GRAPHICAL USER INTERFACE

TECHNICAL FIELD

The present application generally describes graphical user interfaces, and more particularly methods and systems for providing camera-based graphical user interfaces with gesture action recognition.

BACKGROUND

Projectors are a commonly-used alternative to a display for presenting content, such as documents. A projector projects content onto a surface for presentation. A camera can further make the projected content interactive, by capturing user interaction with the projected content.

Creation of content with user interfaces that are supported by camera-based systems poses a challenge. While new markup languages specific to camera-based systems may be developed for the creation of content for camera-based systems, camera-based systems may not have sufficiently wide adoption to justify learning an entirely new markup language with limited utility. Further, there is already a large corpus of content that have not been customized for camera-based systems, and recreating this corpus of content for presentation specifically on camera-based systems is inefficient.

SUMMARY

In accordance with some embodiments, a method is performed at a computer system having one or more processors and memory storing one or more programs configured for execution by the one or more processors. The method includes obtaining an electronic document comprising a plurality of document elements; and injecting into the electronic document in association with a first one of the document elements one or more first hotspot attributes, the first hotspot attributes defining one or more attributes of a first hotspot that is displayable in conjunction with the first document element when the electronic document is displayed by a display system, the first hotspot attributes being associated with one or more predefined physical gestures and one or more respective document actions, such that the first hotspot, when displayed by the display system as part of a displayed electronic document, indicates that a viewer of the displayed electronic document can interact with the displayed electronic document using the one or more predefined physical gestures (i) performed at a position that overlap a displayed version of the electronic document in a field of view of an associated camera system and (ii) captured by the associated camera system. Each of the one or more physical gestures, when captured by the associated camera system, results in a respective one of the document actions being performed on the displayed electronic document.

In accordance with some embodiments, a computer system includes one more processors, and memory storing one or more programs for execution by the one or more processors. The one or more programs include instructions for: obtaining an electronic document comprising a plurality of document elements; and injecting into the electronic document in association with a first one of the document elements one or more first hotspot attributes, the first hotspot attributes defining one or more attributes of a first hotspot that is displayable in conjunction with the first document element when the electronic document is displayed by a display system, the first hotspot attributes being associated with one or more predefined physical gestures and one or more respective document actions, such that the first hotspot, when displayed by the display system as part of a displayed electronic document, indicates that a viewer of the displayed electronic document can interact with the displayed electronic document using the one or more predefined physical gestures (i) performed at a position that overlap a displayed version of the electronic document in a field of view of an associated camera system and (ii) captured by the associated camera system. Each of the one or more physical gestures, when captured by the associated camera system, results in a respective one of the document actions being performed on the displayed electronic document.

In accordance with some embodiments, a non-transitory computer readable storage medium stores one or more programs. The one or more programs include instructions, which, when executed by a computer system with one or more processors, cause the computer system to: obtain an electronic document comprising a plurality of document elements; and inject into the electronic document in association with a first one of the document elements one or more first hotspot attributes, the first hotspot attributes defining one or more attributes of a first hotspot that is displayable in conjunction with the first document element when the electronic document is displayed by a display system, the first hotspot attributes being associated with one or more predefined physical gestures and one or more respective document actions, such that the first hotspot, when displayed by the display system as part of a displayed electronic document, indicates that a viewer of the displayed electronic document can interact with the displayed electronic document using the one or more predefined physical gestures (i) performed at a position that overlap a displayed version of the electronic document in a field of view of an associated camera system and (ii) captured by the associated camera system. Each of the one or more physical gestures, when captured by the associated camera system, results in a respective one of the document actions being performed on the displayed electronic document.

In accordance with some embodiments, a method is performed at a computer system having one or more processors, memory storing one or more programs configured for execution by the one or more processors, a display system, and a camera with a field of view. The method includes: obtaining an electronic document comprising a plurality of displayable document elements and associated sets of hotspot attributes, each of the sets of hotspot attributes being associated with one or more predefined physical gestures and associated document actions and defining one or more attributes of a respective displayable hotspot that is displayable when the electronic document is displayed; displaying the electronic document on the display within the field of view of the camera, the displayed electronic document including one or more displayed hotspots corresponding to and displayed in accordance with the associated sets of hotspot attributes; capturing with the camera physical gestures of a user made in front of the displayed document within the field of view of the camera; determining that a first one of the physical gestures coincides when viewed from the camera with a displayed first hotspot, indicating possible user selection of the hotspot; recognizing the first one of the physical gestures as one of the predefined gesture associated with the first hotspot; and determining that the first physical gesture corresponds to a first document action and performing the first document action on the electronic document.

In accordance with some embodiments, a computer system includes one more processors, a display system, a camera with a field of view, and memory storing one or more programs for execution by the one or more processors. The one or more programs include instructions for: obtaining an electronic document comprising a plurality of displayable document elements and associated sets of hotspot attributes, each of the sets of hotspot attributes being associated with one or more predefined physical gestures and associated document actions and defining one or more attributes of a respective displayable hotspot that is displayable when the electronic document is displayed; displaying the electronic document on the display within the field of view of the camera, the displayed electronic document including one or more displayed hotspots corresponding to and displayed in accordance with the associated sets of hotspot attributes; capturing with the camera physical gestures of a user made in front of the displayed document within the field of view of the camera; determining that a first one of the physical gestures coincides when viewed from the camera with a displayed first hotspot, indicating possible user selection of the hotspot; recognizing the first one of the physical gestures as one of the predefined gesture associated with the first hotspot; and determining that the first physical gesture corresponds to a first document action and performing the first document action on the electronic document.

In accordance with some embodiments, a non-transitory computer readable storage medium stores one or more programs. The one or more programs include instructions, which, when executed by a computer system with one or more processors, a display system, a camera with a field of view, cause the computer system to: obtain an electronic document comprising a plurality of displayable document elements and associated sets of hotspot attributes, each of the sets of hotspot attributes being associated with one or more predefined physical gestures and associated document actions and defining one or more attributes of a respective displayable hotspot that is displayable when the electronic document is displayed; display the electronic document on the display within the field of view of the camera, the displayed electronic document including one or more displayed hotspots corresponding to and displayed in accordance with the associated sets of hotspot attributes; capture with the camera physical gestures of a user made in front of the displayed document within the field of view of the camera; determine that a first one of the physical gestures coincides when viewed from the camera with a displayed first hotspot, indicating possible user selection of the hotspot; recognize the first one of the physical gestures as one of the predefined gesture associated with the first hotspot; and determine that the first physical gesture corresponds to a first document action and perform the first document action on the electronic document.

BRIEF DESCRIPTION OF THE DRAWINGS

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

Figure 1:
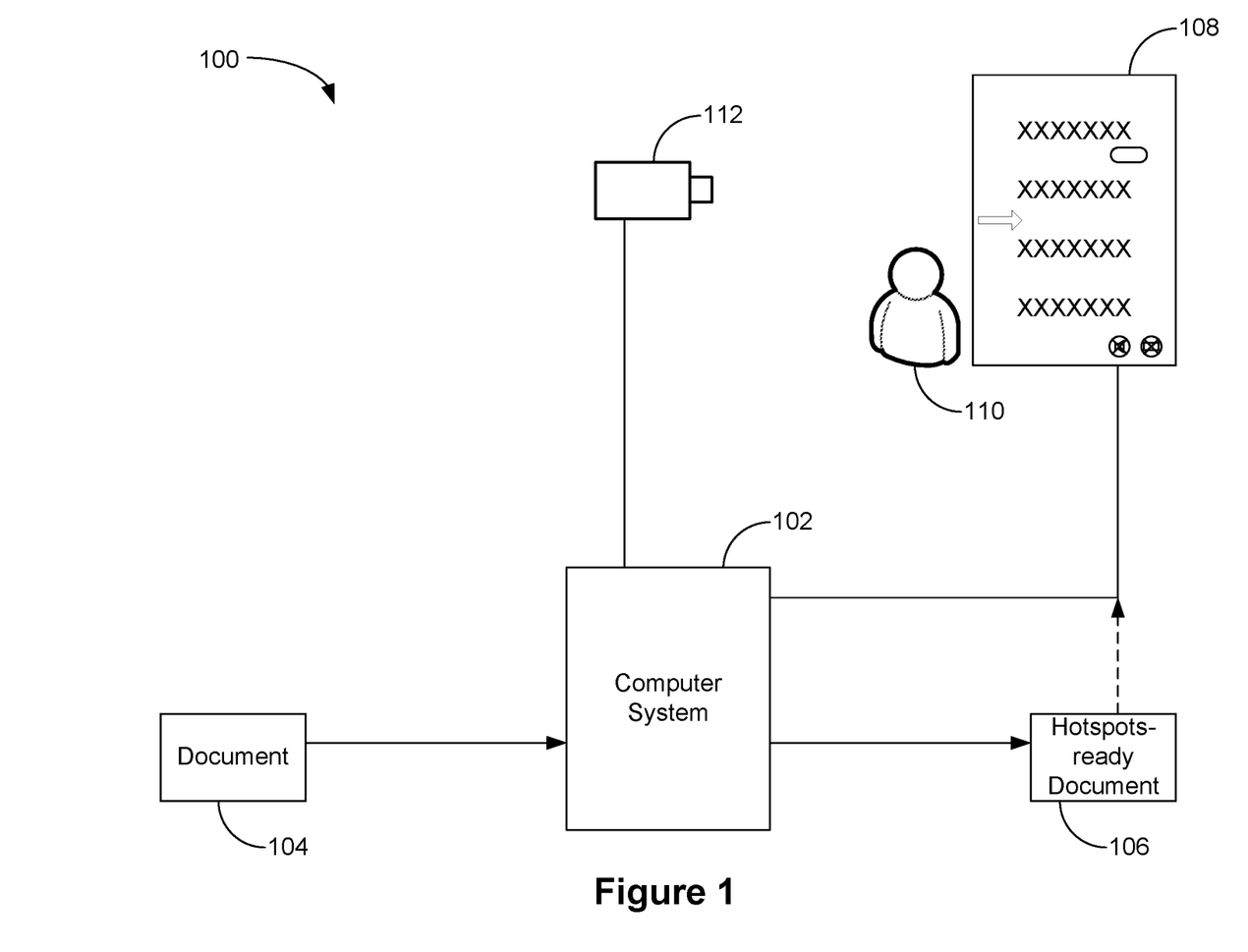
FIG. 1 is a block diagram illustrating an example environment for providing a camera-based graphical user interface in accordance with some embodiments.

FIG. 1 illustrates an environment 100 for providing a camera-based graphical user interface, in accordance with some embodiments. The environment 100 includes a computer system 102. In some embodiments, the computer system 102 may be any of a desktop computer, a laptop or notebook computer, a smartphone, a tablet device, or a multimedia device.

The computer system 102 may communicate with other computer systems or devices through one or more communication networks (not shown). The communication networks may include one or more of: local area networks, wide area networks, cellular networks, ad-hoc networks, and the Internet.

The computer system 102 is configured to obtain a document 104. The document 104 may be obtained from any suitable source, such as from a memory or storage of the computer system 102 (e.g., hard disk drive, solid state drive, flash memory, optical disk, or other non-volatile or volatile memory) or from a remote source through the one or more communication networks (not shown). In some embodiments, the document 104 is a webpage composed using one or more well-known languages for composing webpages (e.g., Hypertext Markup Language (HTML), Extensible Markup Language (XML), JavaScript, Cascading Style Sheets (CSS), etc.). The document 104 includes one or more document elements. The document elements may be text, graphics, images, and/or user interface objects (e.g., buttons, checkboxes, selectable hyperlinks, menus, etc.).

The computer system 102 processes the document 104 to detect and identify one or more of the document elements. The computer system 102 may associate one or more hotspot attributes with a detected document element. The hotspot attributes define one or more attributes of a hotspot associated with the document element when the document is output. The processing yields a hotspots-ready document 106 that includes the detected document elements and associated hotspot attributes.

In some embodiments, the computer system 102 associates hotspot attributes with a detected element by adding (e.g., injecting) into the document one or more hotspot attributes to the portion of the document corresponding to the detected document element. The hotspot attributes may be expressed as text strings composed in a markup language designed for the definition and specification of hotspots and hotspot attributes for camera-based systems. For convenience and brevity, this markup language for hotspots and hotspot attributes will be referred to below as "hotspot markup language." In some embodiments, the text strings specify tags, attributes, and so forth in the hotspot markup language. A text string for a hotspot attribute to be associated with a document element is injected into the document. The text string may be injected into the tag for a document element in the markup of the document (e.g., by adding one or more text string specifying one or more attribute properties to the target document element's tag, by adding one or more text strings defining a sub-element to the target document element), or may otherwise include a reference to the associated document element. In some embodiments, another aspect of the "hotspot markup language" is "hotspot style sheets," which can be applied to existing document elements (e.g. HTML buttons, hypertext links, etc.) to, for example, visually alter the appearance of a document element to make it look like a hotspot, without injecting hotspot attribute properties or sub-elements into the document element.

The computer system 102 may output the hotspots-ready document 106 as an interactive document presentation 108. In some embodiments, the interactive document presentation 108 is projected onto a surface (e.g., a wall, a projection screen, a tabletop) by a projection device coupled to the computer system 102. In some embodiments, the interactive document presentation 108 is displayed (e.g., on a display device coupled to the computer system 102). For convenience and brevity, the interactive document presentation 108 will be referred to below as an "interactive document," and as being displayed regardless of whether the interactive document presentation 108 is displayed or projected.

While displayed, a user 110 may interact with the interactive document 108. For example, the user may perform gesture actions such that, from an external point of reference viewing the interactive document 108, the gesture actions overlap or occlude some portion of the interactive document 108. The interactions (e.g., the gesture actions) may be captured by a camera system 112 so positioned at an external point of reference that has a view of the interactive document 108 and gesture actions that may overlap or occlude the interactive document 108. In some embodiments, the camera system 112 is coupled to the computer system 102. The camera system 112 transmits its capture data (e.g., video, images) to the computer system 102, which processes the capture data to determine the gesture actions performed by the user 110 and the hotspots with respect to which the gesture actions were performed. In some embodiments, the processing includes using neural nets, machine learning, image classification algorithms, and the like to process the capture data to determine gesture actions and the affected hotspots.

Based on the determined gesture actions and hotspots, the computer system 102 determines one or more operations or actions to be performed, and performs the one or more operations or actions. In some embodiments, the actions or operations may be related to the document 108 (e.g., access a hyperlink in the document, select a menu item in the document, navigate within the document, navigate to another document, submit content in a form within the document, presenting the document on a display or a projector). In some embodiments, the actions or operations may be independent of the document 108 (e.g., controlling a teleconference system).

Figure 2:
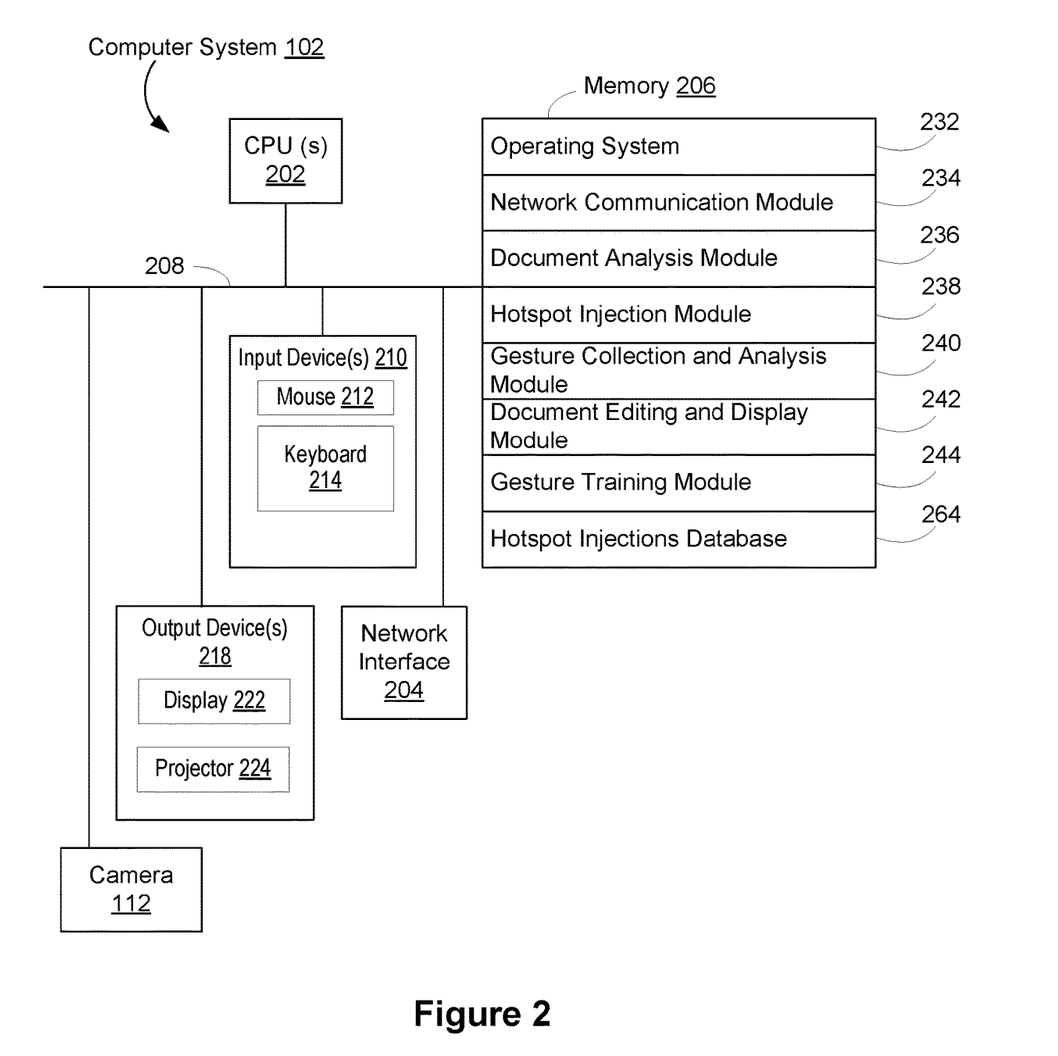
FIG. 2 is a block diagram illustrating an example computer system in accordance with some embodiments.

FIG. 2 is a block diagram illustrating a computer system 102, in accordance with some embodiments. The computer system 102 typically includes one or more processing units (CPU's) 202, one or more network or other communications interfaces 204, memory 206, and one or more communication buses 208 for interconnecting these components. The communication buses 208 optionally include circuitry (sometimes called a chipset) that interconnects and controls communications between system components. The computer system 102 may include one or more input devices 210 (e.g., a mouse 212, keyboard 214, a microphone). Other examples of input devices 210 include a touch-sensitive surface (e.g., a track pad, a touch pad, a touch-sensitive display), a trackball, a joystick, and a keypad. The computer system 102 also may include one or more output devices 218 (e.g., an audio output device (e.g., a speaker, headphones), a display 222, a projector 224). In some embodiments, the computer system 102 also includes or is coupled to a camera system 112.

Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternatively the non-volatile memory device(s) within memory 206, comprises a non-transitory computer readable storage medium. In some embodiments, memory 206 or the computer readable storage medium of memory 206 store the following programs, modules and data structures, or a subset thereof:

- Operating system 232 including procedures for handling various basic system services and for performing hardware dependent tasks;
- Network communication module 234 for connecting the computer system 102 to, and facilitating communication with, other devices, computers, and systems (e.g., other computer systems, server systems, content hosts) via the one or more communication network interfaces 204 (wired or wireless) and one or more communication networks (not shown);
- Document analysis module 236 for processing documents to detect document elements with which hotspots may be associated;
- Hotspot injection module 238 for injecting attributes, tags, etc. of hotspots into a document analyzed by the document analysis module 236, in order to associate hotspots with one or more document elements in the document;
- Gesture collection and analysis module 240 to analyze input data (e.g., image/video capture data from camera system 112) to determine performed gestures and hotspots with respect to which the gestures were performed;
- Document editing and display module 242 for facilitating editing and display of documents;
- Gesture training module 244 for training gesture collection and analysis module 240 to recognize gestures; and
- Hotspot injection database 264 for storing a database of hotspot tags, attributes, and so on that may be injected into documents.

In some embodiments, the gesture training module 244 trains the computer system 102 (e.g., the gesture collection and analysis module 240) to better detect and identify user gestures (e.g., to better differentiate between types of gestures, to reduce incidence of false positives, to reduce incidence of false negatives, etc.). The training may be performed at the computer system 102 or at a separate system. The training may use, for example, machine learning, neural networks, or other known training techniques.

In some embodiments, the hotspot injection module 238, gesture collection and analysis module 240, and gesture training module 244 may be implemented at the same computer system or different computer systems.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows a computer system, FIG. 2 is intended more as functional description of the various features which may be present in a computer system than as a structural schematic of the embodiments described herein. In practice, and as recognized by those of ordinary skill in the art, items shown separately could be combined and some items could be separated.

Figure 3:
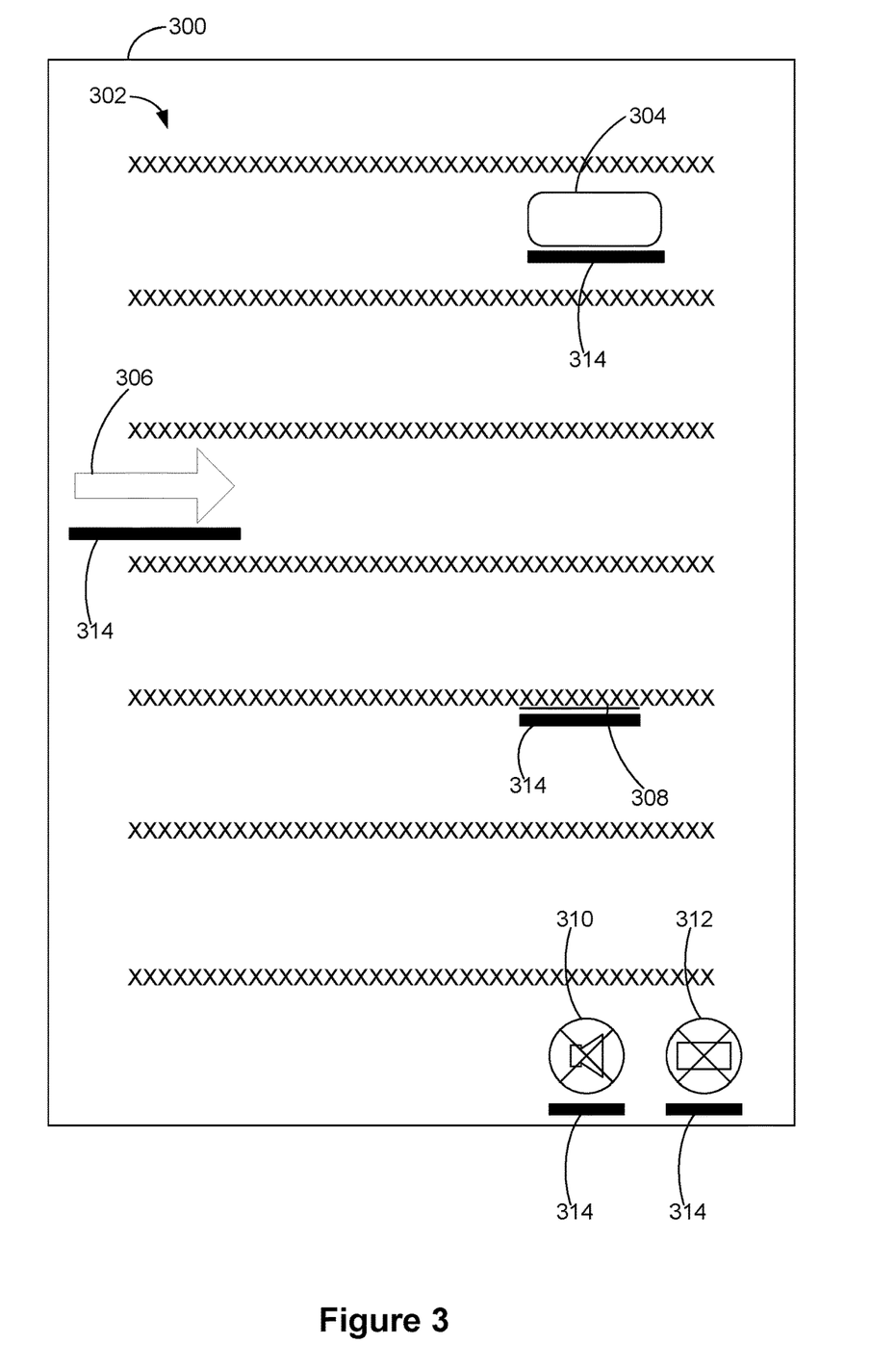
FIG. 3 is a diagram illustrating an example interactive document with hotspots in accordance with some embodiments.

FIG. 3 illustrates an example displayed interactive document 300 with hotspots in accordance with some embodiments. Interactive document 300 (e.g., interactive document 108) includes content 302 and one or more hotspots 304, 306, 308, 310, and 312 interspersed throughout the content 302. The hotpots may be displayed as respective user interface element or graphical widget in the document (e.g., a button, an arrow, an icon, text with underling or other formatting, etc.). In some embodiments, a hotspot icon (e.g. an indicator bar) 314 may be displayed adjacent to (e.g., under) a hotspot to make the hotspot more apparent to users, and also to aid the computer system 102 in the detection and analysis of gesture actions with respect to the hotspot.

In some embodiments, a hotspot may be associated with one or more predefined physical gesture actions and with one or more actions or operations. The physical gesture actions are mapped to respective actions or operations; detection of a physical gesture action results in performance of a mapped action or operation.

For example, button hotspot 304 may be associated with a tapping or pressing gesture action. In response to detection of a tapping or pressing gesture action with respect to the button hotspot 304, an operation associated with the button hotspot 304 (e.g., submitting contents of a form in the document to a remote system) is performed.

As another example, swipe hotspot 306 may be associated with a swipe gesture action that drags along the swipe hotspot 306. In response to detection of a swipe gesture action with respect to the swipe hotspot 306, an operation associated with the swipe hotspot 306 (e.g., navigating to a previous or next document) is performed.

As another example, hyperlink hotspot 308 may be associated with a tapping gesture action. In response to detection of a tapping gesture action with respect to the hyperlink hotspot 308, an operation associated with the hyperlink hotspot 308 (e.g., navigating to the document linked to by the hyperlink hotspot 308) is performed.

As another example, volume control toggle hotspot 310 may be associated with a tapping gesture action. In response to detection of a tapping gesture action with respect to the volume control toggle hotspot 310, an operation associated with the volume control toggle hotspot 310 (e.g., muting/unmuting the volume) is performed.

As another example, display/projector control toggle hotspot 312 may be associated with a tapping gesture action. In response to detection of a tapping gesture action with respect to the display/projector toggle hotspot 312, an operation associated with the display/projector control toggle hotspot 312 (e.g., changing display mode between display and projector) is performed.

When the document 300 is displayed and a user performs a gesture action with respect to a hotspot on the displayed document 300, the gesture action overlaps or occludes at least a part of the hotspot and the adjacent hotspot indicator bar 314. A camera system (e.g., camera system 112) may capture video or images of the gesture action occluding the hotspot and the hotspot indicator bar. The captured video/images are provided to a computer system (e.g., computer system 102), which processes the captured video/images to detect the gesture action with respect to the hotspot. If the hotspot is associated with the detected action, and the detected action with respect to the hotspot is mapped to an operation, the computer system performs the operation.

It should be appreciated that document 300 and the elements included therein are merely examples, and that other implementations and embodiments of documents and hotspots are possible.

Example Processes

Figure 4:
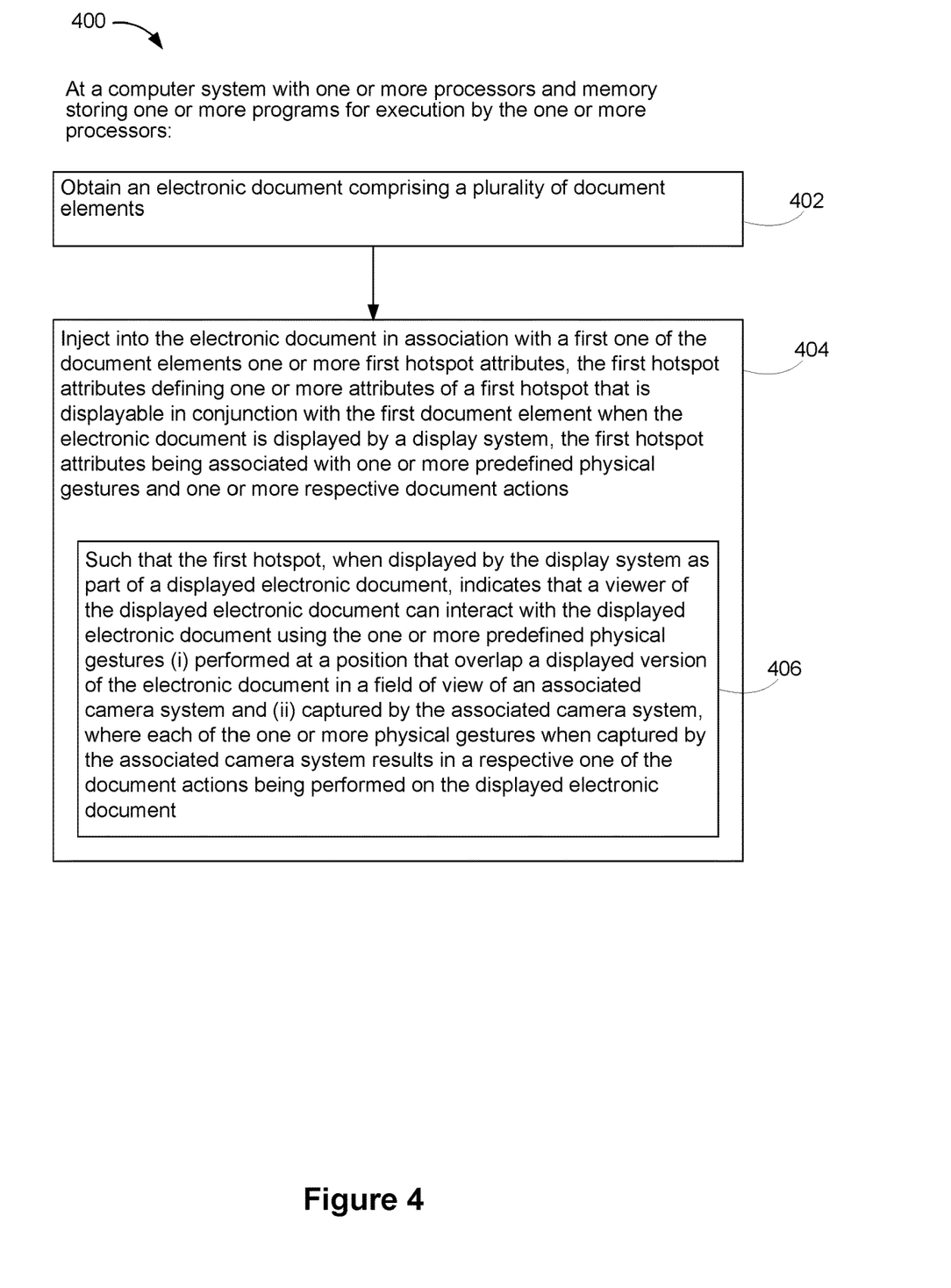
FIG. 4 is a flow diagram of an example method for providing a camera-based graphical user interface in accordance with some embodiments.

FIG. 4 illustrates a flow diagram 400 of a method for providing a camera-based graphical user interface in accordance with some embodiments. In some embodiments, the method 400 is performed at a computer system with one or more processors and memory storing one or more programs for execution by the one or more processors (e.g., the computer system 102 of FIG. 1 executing one or more of the Document Analysis or Hotspot Injection Modules 236, 238 of FIG. 2). Reference is made in the following description to system and program elements depicted in FIGS. 1 and 2; these references are non-limiting and are made for example purposes only.

The system obtains (402) an electronic document (e.g., the electronic document 104 of FIG. 1) including a plurality of document elements. In some embodiments, the obtained document is composed using well-known languages (e.g., HTML, JavaScript, CSS, XML). In some embodiments, the document elements may include graphical widgets (e.g., buttons, pull-down menus, sliders, checkboxes), hyperlinks, icons, etc.

The system injects (404) into the electronic document in association with a first one of the document elements one or more first hotspot attributes. The first hotspot attributes define one or more attributes of a first hotspot that is displayable in conjunction with the first document element when the electronic document is displayed by a display system. The first hotspot attributes are associated with one or more predefined physical gestures and one or more respective document actions. The computer system 102 (e.g., the document analysis module 236 and/or hotspot injection module 238) processes the document to detect the document elements within, and to inject into the document, for one or more of the detected elements, respective sets of one or more hotspot attributes. The resulting document is a hotspots-ready document (e.g., the document 106 of FIG. 1).

In some embodiments, available hotspot tags, attributes, etc. are stored in hotspot injections database 264 and may be retrieved from hotspot injections database 264; the database 264 includes the text strings, parameters, etc. of hotspot tags, attributes, and so forth available for injection into documents. The system retrieves the desired tag, attribute, or the like from the database 264, and injects the retrieved tag, attribute, or the like along with relevant values into the document.

For a document element in the obtained document 102, a set of one or more hotspot attributes may be injected into the document. In some embodiments, the one or more hotspot attributes are expressed as text strings composed in a markup language, and the text strings are injected within or near a portion of the document corresponding to the document element (e.g., by adding an text string specifying an attribute property to the document element's tag, by adding a text string defining a sub-element to the document element). The attributes define attributes of a hotspot that may be displayed along with the associated element when the hotspots-ready document 106 is displayed as an interactive document (e.g., the interactive document 108 of FIG. 1). The attributes for an element are associated with one or more predefined physical gesture actions and one or more respective document actions. The associated gesture actions and document actions define which gesture actions, performed with respect to the hotspot, will trigger which document action; other gesture actions performed with respect to the hotspot are disregarded by the system 102.

The attributes are injected into the document 104 such that the first hotspot, when displayed by the display system as part of a displayed electronic document, indicates that a viewer of the displayed electronic document (e.g., the interactive document 108) can interact with the displayed electronic document using the one or more predefined physical gestures (i) performed at a position that overlap a displayed version of the electronic document in a field of view of an associated camera system and (ii) captured by the associated camera system, where each of the one or more physical gestures when captured by the associated camera system results in a respective one of the document actions being performed on the displayed electronic document (406). In the interactive document 108, the hotspots are displayed with associated document elements. The hotspots indicate to a viewer of the interactive document 108 that the viewer can interact with the interactive document 108 by performing one or more physical gestures with respect to the hotspots. The gestures, when captured by a camera system (e.g., camera system 112), are obtained by the gesture collection and analysis module 240 for detection. The gesture collection and analysis module 240 analyzes the gestures to determine which document actions are to be performed in response to the gestures. The detected gestures result in document actions associated with the hotspots being performed.

In some embodiments, the one or more document actions include one or more of: (i) removing one or more of the document elements from the displayed electronic document; (ii) translating one or more of the document elements to a specific language; (iii) muting or resuming audio output associated with the displayed electronic document; (iv) muting or resuming video display associated with the displayed electronic document; (v) terminating or resuming execution of a script associated with the displayed electronic document; (vi) adding or removing a displayed hotspot from the displayed electronic document; (vii) adding an invisible hotspot to the displayed electronic document in association with a displayed hotspot; (viii) navigating to a second electronic document linked from the displayed electronic document; (ix) controlling the camera system; and (x) controlling a teleconferencing system. The document actions associated with hotspots may include: removing or deleting a document element from the document, having the document translated by machine translation, toggling audio output associated with the document (e.g., muting or un-muting audio output from audio playing in the document), toggling audio from a video associated with the document (e.g., muting or un-muting audio from video playing in the document), toggling playback of audio or video associated with the document (e.g., playing or pausing audio or video playing in the document), adding or removing a visible hotspot to or from the document, adding an invisible hotspot to a document element in the document, navigating to a linked document, controlling a camera system (e.g., issuing a command to the camera system 112 to make an image capture), and controlling a teleconference system (e.g., share a view of the document on the teleconference system).

In some embodiments, the displayed hotspot added to or removed from the displayed electronic document is an e-commerce widget. The hotspot to be added or removed may be a widget associated with an e-commerce entity (e.g., an affordance to purchase an item shown in the document at a particular seller).

In some embodiments, the one or more first hotspot attributes comprise a hotspot type and/or a hotspot visual characteristic. The hotspot attributes injected into the document for a document element may specify the type of hotspot (e.g., button, icon, etc.) and/or a visual characteristic (e.g., size, color, etc.) of the hotspot.

In some embodiments, the hotspot type is one of a button or a swipe widget. A hotspot may be a button (e.g., a virtual button, a toggle icon) (e.g., button hotspot 304; toggle hotspots 310, 312) or a swipe widget (e.g., swipe hotspot 306). In some embodiments, a swipe widget is an icon that may be dragged along the document by a swipe gesture action. The swipe widget provides a visual hint for the user to guide the swipe gesture action. Other examples of hotspots include hyperlinks, pull-down menus, checkboxes, radio buttons, text boxes, and so on.

In some embodiments, the visual characteristic of the first hotspot indicates a direction of a swipe gesture associated with the swipe widget. The swipe widget may include, for example, an arrow indicating a direction of the associated swipe gesture action.

In some embodiments, the visual characteristic indicates a size of the displayed hotspot, wherein the size is defined such that the hotspot is of sufficient size when displayed such that it is not obscured entirely by a user gesture performed in front of the hotspot. The visual characteristic attribute may specify a size of the hotspot, so that the hotspot is large enough to not be entirely obscured or occluded by gesture actions of users (e.g., larger than the width of an adult human finger used for performing the gesture).

In some embodiments, each of the document elements comprises respective content and tag portions, the respective tag portion defining a characteristic of the respective content portion. The system analyzes structure of the electronic document by evaluating types of one or more tag portions associated with one or more of the document elements including the first document element, wherein the first document element includes a first tag portion; based on the evaluated type of the first tag portion, determines whether the first document element is a candidate for association with a hotspot; and in response to the determination, performs the injection of the first hotspot attributes in association with the first document element. The document 104 may be composed using a markup language (e.g., HTML, XML), and the document 104 may include content (e.g., content text) and tags (e.g., starting tags and end tags). The tags, specifically respective starting-ending tag pairs, enclose content portions. The document analysis module 236 and/or hotspot injection module 238 analyzes the structure of the document 104 to identify the tag portions (e.g., the portions enclosed by pairs of starting and ending tags) and determine their types. The document elements are identified from the identified tag portions. The document analysis module 236 and/or hotspot injection module 238 determines if a document element is a candidate for hotspot attribute injection. If the document element is a candidate for hotspot attribute injection, one or more hotspot attributes are injected into the corresponding tag portion.

In some embodiments, the display system is a projection system or a direct display system. The interactive document 108 may be projected onto a surface by a projector or displayed on a display.

In some embodiments, the camera system is positioned so that the gesture and the displayed electronic document are simultaneously in a field of view of the camera system, and wherein the display system and camera system are communicatively coupled with one another so as to enable the camera system to transmit information pertaining to the gesture to the display system so as to enable the display to perform on the electronic document the document action associated with the gesture for which the information was transmitted. The camera system 112 is positioned so that the interactive document 108, when displayed, and gesture actions by the user 110 are in the field of view of the camera 112 and thus able to be captured by the camera system 112. The camera system 112 and the display system for displaying the interactive document 108 (e.g., a projector system, a display) are communicatively coupled through the computer system 102. The camera system 112 captures gestures performed by the user 110 on the interactive document 108, and transmits the capture data to the computer system 102. The computer system 102 processes the capture data to determine the document actions to be performed. The computer system 102 performs the document actions and transmits display data to the display system to show the results of the document actions on the interactive document 108 to the user 110.

Figure 5:
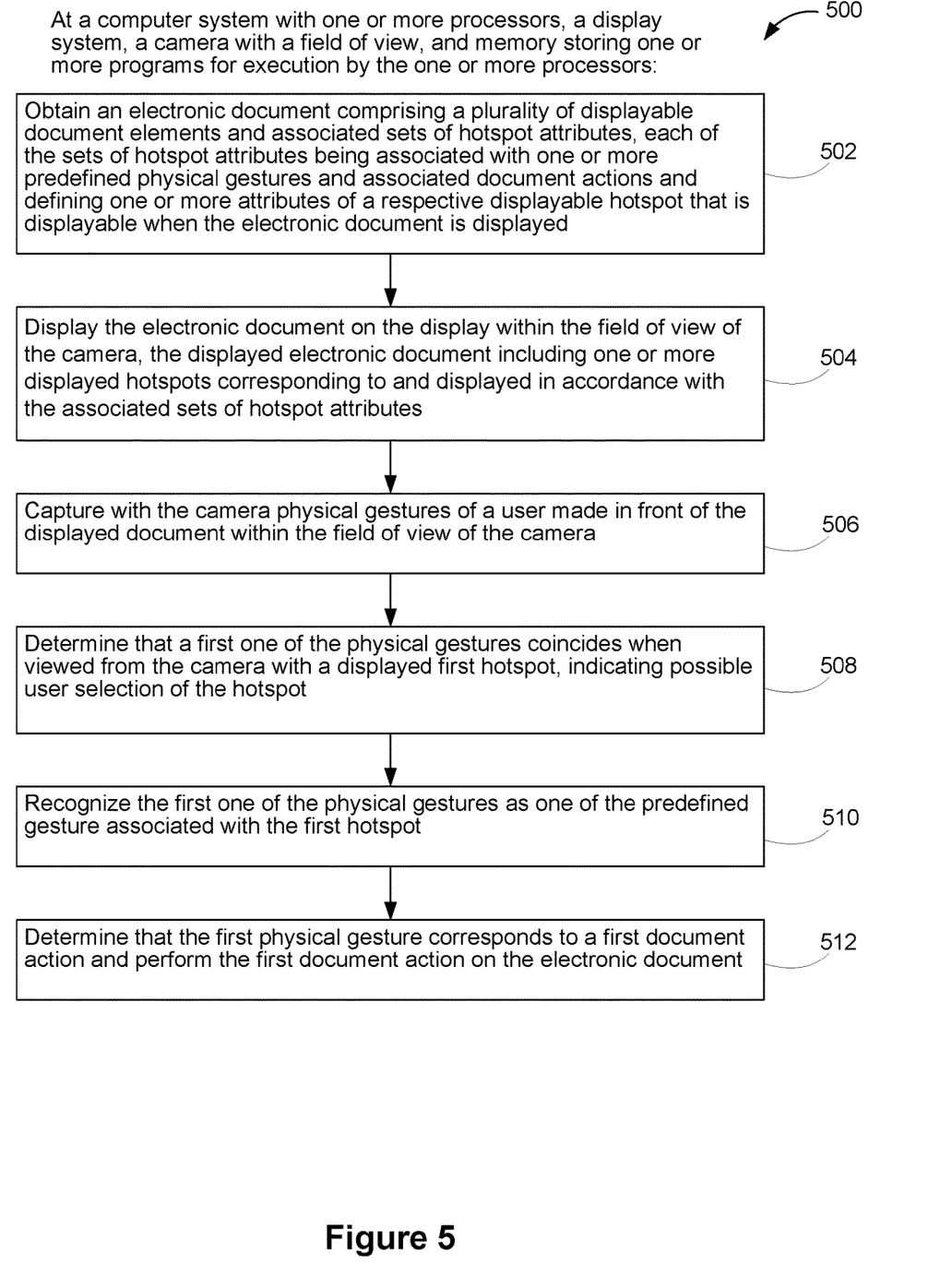
FIG. 5 is a flow diagram of an example method for performing document actions in accordance with some embodiments.

FIG. 5 illustrates a flow diagram 500 of a method for performing document actions in accordance with some embodiments. In some embodiments, the method 500 is performed at a computer system with one or more processors, a display system (e.g., a projector system or a display), a camera system with a field of view (e.g., camera system 112), and memory storing one or more programs for execution by the one or more processors (e.g., at a computer system 102 of FIG. 1 executing one or more of the Gesture Collection and Analysis and Document Editing and Display Modules 240, 242 of FIG. 2).

The system obtains (502) an electronic document comprising a plurality of displayable document elements and associated sets of hotspot attributes, each of the sets of hotspot attributes being associated with one or more predefined physical gestures and associated document actions and defining one or more attributes of a respective displayable hotspot that is displayable when the electronic document is displayed. The computer system 102 obtains a hotspots-ready document 106 (e.g., by injecting hotspot attributes into a document 104). The hotspots-ready document 106 includes multiple document elements, and respective associated sets of one or more hotspot attributes. The set of hotspot attributes for a document element associates the element with a hotspot that is associated with one or more gesture actions and one or more document actions.

In some embodiments, hotspots are associated with particular tags of document elements. For example, a hotspot associated with an element are associated with the starting and ending tags for that element in the document, and may thus be anchored to that element in the document.

In some embodiments, available hotspot tags, attributes, etc. are stored in hotspot injections database 264 and may be retrieved from hotspot injections database 264; the database 264 includes the text strings, parameters, etc. of hotspot tags, attributes, and so forth available for injection into documents. The system retrieves the desired tag, attribute, or the like from the database 264, and injects the retrieved tag, attribute, or the like along with relevant values into the document.

The system displays (504) the electronic document on the display within the field of view of the camera, the displayed electronic document including one or more displayed hotspots corresponding to and displayed in accordance with the associated sets of hotspot attributes. The computer system 102 causes the hotspots-ready document 106 to be displayed within the field of view of the camera system 112 (e.g., outputs the hotspots document 106 to a display or projector system for display) as interactive document 108. The interactive document 108 includes hotspots corresponding to the sets of hotspot attributes and displayed in accordance to those sets of attributes.

The system captures (506) with the camera physical gestures of a user made in front of the displayed document within the field of view of the camera. The camera system 112 captures gestures performed by a user 110 in a way that occludes portions of the interactive document 108 in view of the camera 112.

The system determines (508) that a first one of the physical gestures coincides when viewed from the camera with a displayed first hotspot, indicating possible user selection of the hotspot. The gesture collection and analysis module 240 analyzes capture data from the camera system 112, and detects one or more gestures. The module 240 determines that one of the gestures overlaps or occludes a hotspot in the interactive document, which indicates that the user 110 may be activating the hotspot.

The system recognizes (510) the first one of the physical gestures as one of the predefined gesture associated with the first hotspot. The system determines (512) that the first physical gesture corresponds to a first document action, and performs the first document action on the electronic document. The gesture collection and analysis module 240 recognizes the detected gesture as a gesture associated with the hotspot, and the gesture associated with the hotspot is associated with a document action. In accordance with this recognition, the computer system 102 performs the document action.

In some embodiments, the system updates the displayed electronic document to reflect the performed first document action. When the computer system 102 performs the document action, the computer system 102 (e.g., the document editing and display module 242) updates the output of the document in accordance with the performed document action.

In some embodiments, in response to determining that the first one of the physical gestures coincides when viewed from the camera with the displayed first hotspot, the system changes a first visual characteristic of the displayed first hotspot to indicate possible user selection of the displayed first hotspot. The computer system 102 (e.g., the document editing and display module 242) updates the visual look of the hotspot with respect to which the gesture is performed.

In some embodiments, in response to recognizing the first one of the physical gestures as one of the predefined gesture associated with the first hotspot, the system changes a second visual characteristic of the displayed first hotspot to indicate recognition of the first physical gesture. In accordance with a determination that the gesture is associated with the hotspot with respect to which the gesture is performed, the computer system 102 (e.g., the document editing and display module 242) further updates the visual look of the hotspot.

For example, when the computer system 102 detects a gesture performed with respect to a hotspot, the computer system 102 (e.g., the document editing and display module 242) updates the visual look of the hotspot. The visual look update changes one or more visual characteristics (e.g. color, size, border thickness, text size, text color) of the hotspot. When the computer system 102 further determines that the gesture is one of the predefined gestures associated with the hotspot, the computer system 102 (e.g., the document editing and display module 242) further updates the visual look of the hotspot. This update may change the same or different visual characteristics as the update when the gesture is detected as performed with respect to the hotspot.

In some embodiments, determining that a first one of the physical gestures coincides when viewed from the camera with a displayed first hotspot includes evaluating degree of occlusion of the displayed first hotspot by the use gesture; when the degree of occlusion exceeds a first threshold, determining that the user did not intend to select the displayed first hotspot; and when the degree of occlusion is less than the first threshold, determining that the user intended to select the displayed first hotspot. The computer system 102 (e.g., the gesture collection and analysis module 240) determines how much the gesture occludes the hotspot. If the occlusion is determined to be more than a threshold, the computer system 102 determines that the user 110 did not intend to select or activate the hotspot. If the occlusion is determined to be less than a threshold, the computers system 102 determines that the user 110 intended to select or activate the hotspot.

In some embodiments, the system, prior to the obtaining, injects into the electronic document in association with a first one of the document elements a first set of one or more hotspot attributes, the first set of hotspot attributes defining one or more attributes of a first hotspot that is displayable in conjunction with the first document element when the electronic document is displayed, the first set of hotspot attributes being associated with one or more physical gestures and one or more respective document actions. The computer system 102 injects hotspot attributes into a document 102, resulting in the hotspots-ready document 106 obtained by the computer system 102.

In some embodiments, performing the one or more document actions includes one or more of: (i) removing one or more of the document elements from the displayed electronic document; (ii) translating one or more of the document elements to a specific language; (iii) muting or resuming audio output associated with the displayed electronic document; (iv) muting or resuming video display associated with the displayed electronic document; (v) terminating or resuming execution of a script associated with the displayed electronic document; (vi) adding or removing a displayed hotspot from the displayed electronic document; (vii) adding an invisible hotspot to the displayed electronic document in association with a displayed hotspot; (viii) navigating to a second electronic document linked from the displayed electronic document; (ix) controlling the camera system; and (x) controlling a teleconferencing system. The document actions performed by the computer system 102 may be: removing or deleting a document element from the document, having the document translated by machine translation, toggling audio output associated with the document (e.g., muting or un-muting audio output from audio playing in the document), toggling audio from a video associated with the document (e.g., muting or un-muting audio from video playing in the document), toggling playback of audio or video associated with the document (e.g., playing or pausing audio or video playing in the document), adding or removing a visible hotspot to or from the document, adding an invisible hotspot to a document element in the document, navigating to a linked document, controlling a camera system (e.g., issuing a command to the camera system 112 to make an image capture), and controlling a teleconference system (e.g., share a view of the document on the teleconference system).

In some embodiments, the displayed hotspot added to or removed from the displayed electronic document is an e-commerce widget. The hotspot to be added or removed may be a widget associated with an e-commerce entity (e.g., an affordance to purchase an item shown in the document at a particular seller).

In some embodiments, the first set of hotspot attributes comprises a hotspot type and/or a hotspot visual characteristic. The hotspot attributes may specify the type of hotspot (e.g., button, icon, etc.) and/or a visual characteristic (e.g., size, color, etc.) of the hotspot.

In some embodiments, the hotspot type is one of a button or a swipe widget. A hotspot may be a button (e.g., a virtual button, a toggle icon) (e.g., button hotspot 304; toggle hotspots 310, 312) or a swipe widget (e.g., swipe hotspot 306). In some embodiments, a swipe widget is an icon that may be dragged along the document by a swipe gesture action. The swipe widget provides a visual hint for the user to guide the swipe gesture action. Other examples of hotspots include hyperlinks, pull-down menus, checkboxes, radio buttons, text boxes, and so on.

In some embodiments, the visual characteristic of the first hot spot indicates a direction of a swipe gesture associated with the swipe widget. The swipe widget may include, for example, an arrow indicating a direction of the associated swipe gesture action.

In some embodiments, the visual characteristic indicates a size of the displayed hotspot, wherein the size is defined such that the hotspot is of sufficient size when displayed such that it is not obscured entirely by a user gesture performed in front of the hotspot. The visual characteristic attribute may specify a size of the hotspot, so that the hotspot is large enough to not be entirely obscured or occluded by gesture actions of users.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
at a computer system having one or more processors and memory storing one or more programs configured for execution by the one or more processors:
obtaining an electronic document comprising a plurality of document elements; and
injecting, into the electronic document in association with a first document element of the plurality of document elements, one or more first hotspot attributes, the first hotspot attributes defining one or more attributes of a first hotspot that is displayable in conjunction with the first document element when the electronic document is displayed by a display system, the one or more first hotspot attributes being associated with one or more predefined physical gestures and one or more respective document actions;
such that the first hotspot, when displayed by the display system as part of a displayed electronic document, indicates that a viewer of the displayed electronic document can interact with the displayed electronic document using the one or more predefined physical gestures (i) performed at a position that overlap a displayed version of the electronic document in a field of view of an associated camera system and (ii) captured by the associated camera system, wherein each of the one or more predefined physical gestures when captured by the associated camera system results in a respective one of the document actions being performed on the displayed electronic document;
wherein the one or more document actions comprise controlling the associated camera system.

2. The method of claim 1, wherein the one or more document actions further comprise one or more of: (i) removing one or more of the document elements from the displayed electronic document; (ii) translating one or more of the document elements to a specific language; (iii) muting or resuming audio output associated with the displayed electronic document; (iv) muting or resuming video display associated with the displayed electronic document; (ix) terminating or resuming execution of a script associated with the displayed electronic document; and (x) adding an invisible hotspot to the displayed electronic document in association with a displayed hotspot.

3. The method of claim 1, wherein the one or more document actions further comprise adding or removing an e-commerce widget.

4. The method of claim 1, wherein the one or more first hotspot attributes comprise a hotspot type and/or a hotspot visual characteristic.

5. The method of claim 4, wherein the hotspot type is one of a button or a swipe widget.

6. The method of claim 5, wherein the visual characteristic of the first hotspot indicates a direction of a swipe gesture associated with the swipe widget.

7. The method of claim 5, wherein the visual characteristic indicates a size of the displayed hotspot, wherein the size is defined such that the first hotspot is of sufficient size when displayed such that it is not obscured entirely by a user gesture performed in front of the first hotspot.

8. The method of claim 1, wherein each of the document elements comprises respective content and tag portions, a respective tag portion defining a characteristic of a respective content portion, further comprising:
analyzing structure of the electronic document by evaluating types of one or more tag portions associated with one or more of the document elements including the first document element, wherein the first document element includes a first tag portion;
based on the evaluated type of the first tag portion, determining whether the first document element is a candidate for association with a hotspot; and
in response to the determination, performing the injection of the one or more first hotspot attributes in association with the first document element.

9. The method of claim 1, wherein the display system is a projection system or a direct display system.

10. The method of claim 1, wherein the associated camera system is positioned so that a gesture of the one or more predefined physical gestures and the displayed electronic document are simultaneously in a field of view of the associated camera system, and wherein the display system and the associated camera system are communicatively coupled with one another so as to enable the associated camera system to transmit information pertaining to the gesture to the display system so as to enable the display system to perform on the electronic document the document action associated with the gesture for which the information was transmitted.

11. A computer system, comprising:
one or more processors; and
memory storing one or more programs configured for execution by the one or more processors, the one or more programs comprising instructions for:
obtaining an electronic document comprising a plurality of document elements; and
injecting into the electronic document in association with a first document element of the document elements one or more first hotspot attributes, the first hotspot attributes defining one or more attributes of a first hotspot that is displayable in conjunction with the first document element when the electronic document is displayed by a display system, the first hotspot attributes being associated with one or more predefined physical gestures and one or more respective document actions;
such that the first hotspot, when displayed by the display system as part of a displayed electronic document, indicates that a viewer of the displayed electronic document can interact with the displayed electronic document using the one or more predefined physical gestures (i) performed at a position that overlap a displayed version of the electronic document in a field of view of an associated camera system and (ii) captured by the associated camera system, wherein each of the one or more predefined physical gestures when captured by the associated camera system results in a respective one of the document actions being performed on the displayed electronic document;
wherein the one or more document actions comprise controlling the associated camera system.

12. The computer system of claim 11, wherein the one or more document actions further comprise removing one or more of the document elements from the displayed electronic document.

13. The computer system of claim 11, wherein the one or more document actions further comprise translating one or more of the document elements to a specific language.

14. The computer system of claim 11, wherein the one or more document actions further comprise muting or resuming audio output associated with the displayed electronic document.

15. The computer system of claim 11, wherein the one or more document actions further comprise muting or resuming video display associated with the displayed electronic document.

* * * * *